US012231053B2

(12) United States Patent
Wen et al.

(10) Patent No.: US 12,231,053 B2
(45) Date of Patent: Feb. 18, 2025

(54) HYBRID POWER CONVERSION CIRCUIT

(71) Applicant: DELTA ELECTRONICS, INC., Taoyuan (TW)

(72) Inventors: Sheng-Yu Wen, Taoyuan (TW); Cheng-Yi Lin, Taoyuan (TW); Ting-Yun Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/601,432

(22) Filed: Mar. 11, 2024

(65) Prior Publication Data

US 2024/0266965 A1 Aug. 8, 2024

Related U.S. Application Data

(63) Continuation of application No. 17/963,733, filed on Oct. 11, 2022, now Pat. No. 11,967,906.

(30) Foreign Application Priority Data

May 10, 2022 (CN) .................. 202210505646.X

(51) Int. Cl.
*H02M 3/335* (2006.01)
*H02M 1/00* (2006.01)

(52) U.S. Cl.
CPC ..... *H02M 3/33592* (2013.01); *H02M 1/0095* (2021.05); *H02M 3/33571* (2021.05); *H02M 3/33576* (2013.01)

(58) Field of Classification Search
CPC ......... H02M 3/33571; H02M 3/33576; H02M 3/33592
See application file for complete search history.

(56) References Cited

U.S. PATENT DOCUMENTS 11,005,378 B2 5/2021 Medina-Garcia
2012/0287680 A1* 11/2012 Luo .................. H02M 3/33507
363/21.02
(Continued)

FOREIGN PATENT DOCUMENTS

CN 112821483 A 5/2021
CN 110719029 B 8/2021
(Continued)

OTHER PUBLICATIONS

Chen, Yang et al, "Improving SRC with capacitor bypassing method for universal AC-DC adapter", 2018 IEEE Applied Power Electronics Conderence and Exposition (APEC), IEEE, Mar. 4, 2018, pp. 746-753, XP033347330, DOI: 10.1109/APEC.2018.8341095 [retrieved on Apr. 18, 2018]; Abstract; Figs. 1, 8-10.
(Continued)

*Primary Examiner* — Gary A Nash
(74) *Attorney, Agent, or Firm* — Muncy, Geissler, Olds & Lowe, P.C.

(57) ABSTRACT

A hybrid power conversion circuit includes a high-side switch, a low-side switch, a transformer, a resonance tank, a first switch, a second switch, a first synchronous rectification switch, a second synchronous rectification switch, and a third switch. The resonance tank has an external inductor, an external capacitance, and an internal inductor. The first switch is connected to the external inductor. The second switch and a first capacitance form a series-connected path, and is connected to the external capacitance. The first and second synchronous rectification switches are respectively coupled to a first winding and a second winding. The third switch is connected to the second synchronous rectification switch. When an output voltage is less than a voltage interval, the hybrid power conversion circuit operates in a hybrid flyback conversion mode, and otherwise the hybrid (Continued)

power conversion circuit operates in a resonance conversion mode.

15 Claims, 7 Drawing Sheets

(56) References Cited

U.S. PATENT DOCUMENTS

| | | | |
|---|---|---|---|
| 2016/0094135 A1 | 3/2016 | Dai et al. | |
| 2016/0141951 A1* | 5/2016 | Mao | H02M 1/36 363/21.02 |
| 2017/0085172 A1 | 3/2017 | Low et al. | |
| 2017/0170723 A1 | 6/2017 | Low et al. | |
| 2017/0207707 A1 | 7/2017 | Dai et al. | |
| 2019/0356230 A1* | 11/2019 | Yeh | H02M 1/08 |
| 2020/0136517 A1 | 4/2020 | Dai et al. | |
| 2020/0150154 A1* | 5/2020 | Chang | H02M 3/33592 |
| 2020/0287472 A1* | 9/2020 | Ye | H02M 3/01 |
| 2020/0366215 A1 | 11/2020 | Chen et al. | |
| 2020/0382012 A1* | 12/2020 | Ksiazek | H02M 1/083 |
| 2021/0159802 A1 | 5/2021 | Yau et al. | |

FOREIGN PATENT DOCUMENTS

| | | |
|---|---|---|
| EP | 2800230 A1 | 11/2014 |
| JP | 2020058116 A | 4/2020 |
| TW | 201547171 | 12/2015 |
| TW | 201603463 A | 1/2016 |
| TW | 202121813 A | 6/2021 |

OTHER PUBLICATIONS

Rajput, Akshata et al, "A LLC Resonant Converter with Wide Output Voltage Range for USB—Power Delivery", 2021 National Power Electronics Conference (NPEC), IEEE, Dec. 15, 2021, pp. 1-6, XP034067815, DOI: 10.1109/NPEC52100.2021.9672472 [retrieved on Jan. 5, 2022]; Section II. Porposed Topology; Fig. 1.

Search Report dated May 17, 2023 of the correponding European patent application No. 22200116.6.

Office Action dated Feb. 6, 2023 of the corresponding Taiwan patente application No. 111117468.

* cited by examiner

HYBRID POWER CONVERSION CIRCUIT

CROSS-REFERENCE TO RELATED APPLICATION

This application is a continuing application of U.S. patent application Ser. No. 17/963,733, filed on Oct. 11, 2022, and entitled "HYBRID POWER CONVERSION CIRCUIT", which claims priority to CN202210505646.X filed on May 10, 2022. The entire disclosures of the above applications are all incorporated herein by reference.

BACKGROUND

Technical Field

The present disclosure relates to a hybrid power conversion circuit, and more particularly to a hybrid power conversion circuit with a hybrid flyback conversion mode and a resonance conversion mode.

Description of Related Art

The statements in this section merely provide background information related to the present disclosure and do not necessarily constitute prior art.

In the past, various mobile devices such as notebook computers, mobile phones, etc. usually adopted different charging interfaces due to different brands and chip manufacturers designed for use. As a result, many chargers provided with mobile devices on the market cannot be compatible with each other across brands, thus causing waste of chargers and environmental problems after the devices are eliminated. In addition, due to the rapid development of diversified functional applications of mobile devices, the power consumption is relatively increased, and the battery capacity is also relatively increased to meet more different usage needs.

USB power delivery (USB PD) is one of the current mainstream fast charging protocols, and it is a fast-charging specification formulated by the USB Implementers Forum (USB-IF). This specification enables higher voltages and currents, delivers higher power, and can freely change the direction of power delivery. High-speed (fast-speed) charging through the USB Type-C interface, and adding data transmission functions, covering the range from mobile phones, notebook computer external storage peripherals, AIO (All in one) monitors, so that all charging and data transmission use a Type-C wire to complete.

The latest USB Implementers Forum released the updated USB PD3.1 fast charging standard specification on Jun. 2, 2021. The charging power has been increased from the original 100 watts to 240 watts, which can support a maximum voltage/current power of 48V/5 A, and this new specification has aroused widespread concern in the industry.

The current common practice of output variable voltage is to use a flyback conversion topology or a resonance conversion and buck conversion (LLC+buck) topology. For the flyback conversion topology, the efficiency improvement is limited due to the influence of the working mode and lower magnetic flux utilization. For the resonance conversion (LLC) topology, although the shortcomings of the flyback conversion topology can be compensated, which means that the efficiency can be improved, it is limited by the gain design and cannot achieve a wide range of variable voltage. Accordingly, the resonance conversion topology usually needs to be implemented with a buck conversion topology. However, the buck conversion topology itself also has the problem of power loss so that the average efficiency of the variable voltage cannot be optimized under the resonance conversion and buck conversion (LLC+buck) topology, resulting in causing unnecessary costs. Also, under the increasingly stringent energy-saving regulations, these two commonly used topologies have long fallen short of expectations.

SUMMARY

An object of the present disclosure is to provide a hybrid power conversion circuit to solve the problems of existing technology.

In order to achieve the above-mentioned object, the hybrid power conversion circuit converts an input voltage into an output voltage, and includes a high-side switch, a low-side switch, a transformer, a resonance tank, a first switch, a second switch, a first synchronous rectification switch, a second synchronous rectification switch, and a third switch. The high-side switch and the low-side switch are connected at a first node. The high-side switch is connected to a positive voltage end of the input voltage, and the low-side switch is connected to a negative voltage end of the input voltage. The transformer includes a primary-side winding and a secondary-side winding. The resonance tank includes an external inductance, an external capacitance, and an internal inductance of the primary-side winding coupled in series. The resonance tank is connected to the low-side switch in parallel. The first switch is connected to the external inductance in parallel. The second switch and a first capacitance form a series-connected path, and the series-connected path is connected to the external capacitance in parallel. The first synchronous rectification switch and the second synchronous rectification switch are respectively coupled to a first winding and a second winding of the secondary-side winding. The third switch is connected to the second synchronous rectification switch in series. When the output voltage is less than a voltage interval, the hybrid power conversion circuit operates in a hybrid flyback conversion mode; when the output voltage is greater than the voltage interval, the hybrid power conversion circuit operates in a resonance conversion mode.

Accordingly, by detecting the output side voltage through the communication with the load to determine whether the hybrid power conversion circuit should operate in the HFB mode or the LLC mode, thereby achieving high efficiency, high gain, and the effect of a wide range of variable voltage under different output power requirements.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
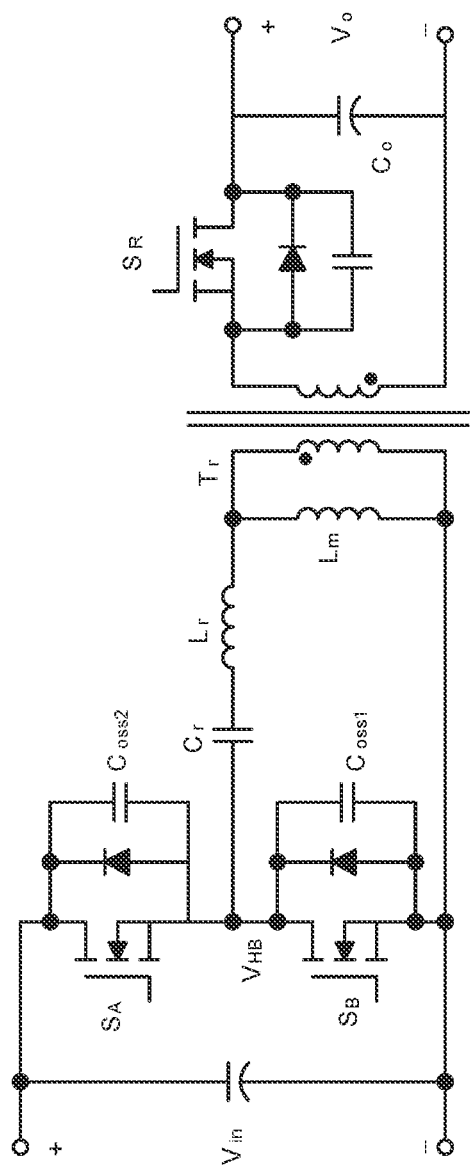
FIG. 1 is a circuit diagram of a hybrid flyback converter.

Reference will now be made to the drawing figures to describe the present disclosure in detail. It will be understood that the drawing figures and exemplified embodiments of present disclosure are not limited to the details thereof.

Figure 2:
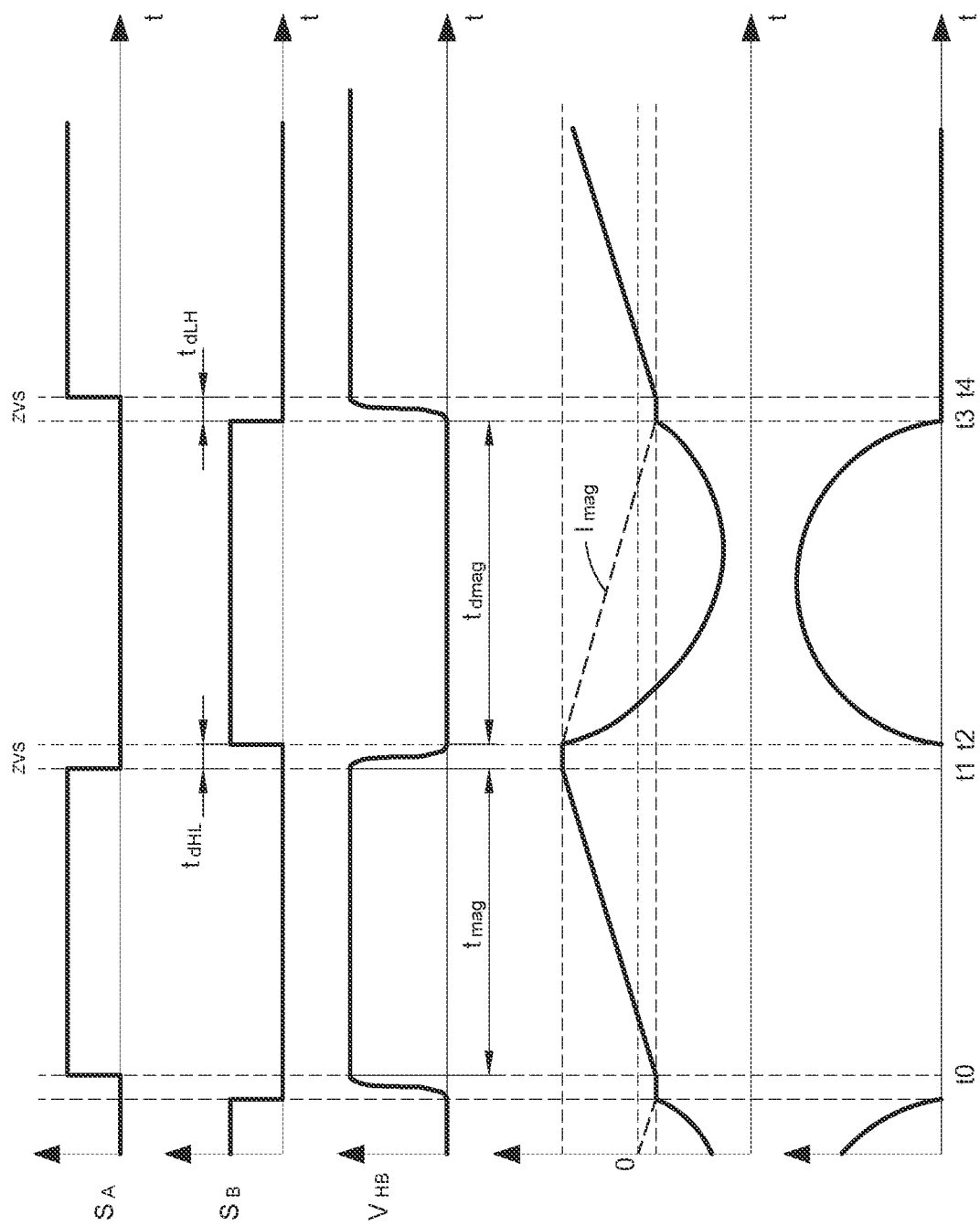
FIG. 2 is a waveform of operations of the hybrid flyback converter shown in FIG. 1.

Please refer to FIG. 1 and FIG. 2, which show a circuit diagram of a hybrid flyback converter and a waveform of operations of the hybrid flyback converter shown in FIG. 1, respectively. The hybrid flyback converter mainly operates in the flyback conversion mode in one half cycle, and operates in the resonance conversion mode in the other half cycle. As shown in FIG. 1, the hybrid flyback converter mainly includes a high-side switch, a low-side switch, and a resonance tank. Corresponding to FIG. 2, during the half cycle from time t0 to time t1, a first control signal $S_A$ of controlling the high-side switch turns on the high-side switch at a high level, and correspondingly a second control signal $S_B$ of controlling the low-side switch turns off the low-side switch at a low level. Therefore, an input power $V_{in}$ stores energy in the resonance tank through the high-side switch so that an excitation current $I_{mag}$ gradually increases, that is, in this half cycle, the operation of energy storage in the form of flyback is implemented.

During the half cycle from time t2 to time t3, the first control signal $S_A$ turns off the high-side switch at a low level, and correspondingly the second control signal $S_B$ turns on the low-side switch at a high level. Therefore, the energy stored in the resonance tank is released through the low-side switch and a synchronous rectification switch $S_R$ on the secondary side so that the excitation current $I_{mag}$ gradually decreases, that is, in this half cycle, the operation of energy release in the form of LLC is implemented.

In addition, between time t1 and time t2 and between time t3 and time t4 are intervals of zero-voltage switching (ZVS) of the high-side switch and the low-side switch.

Figure 3:
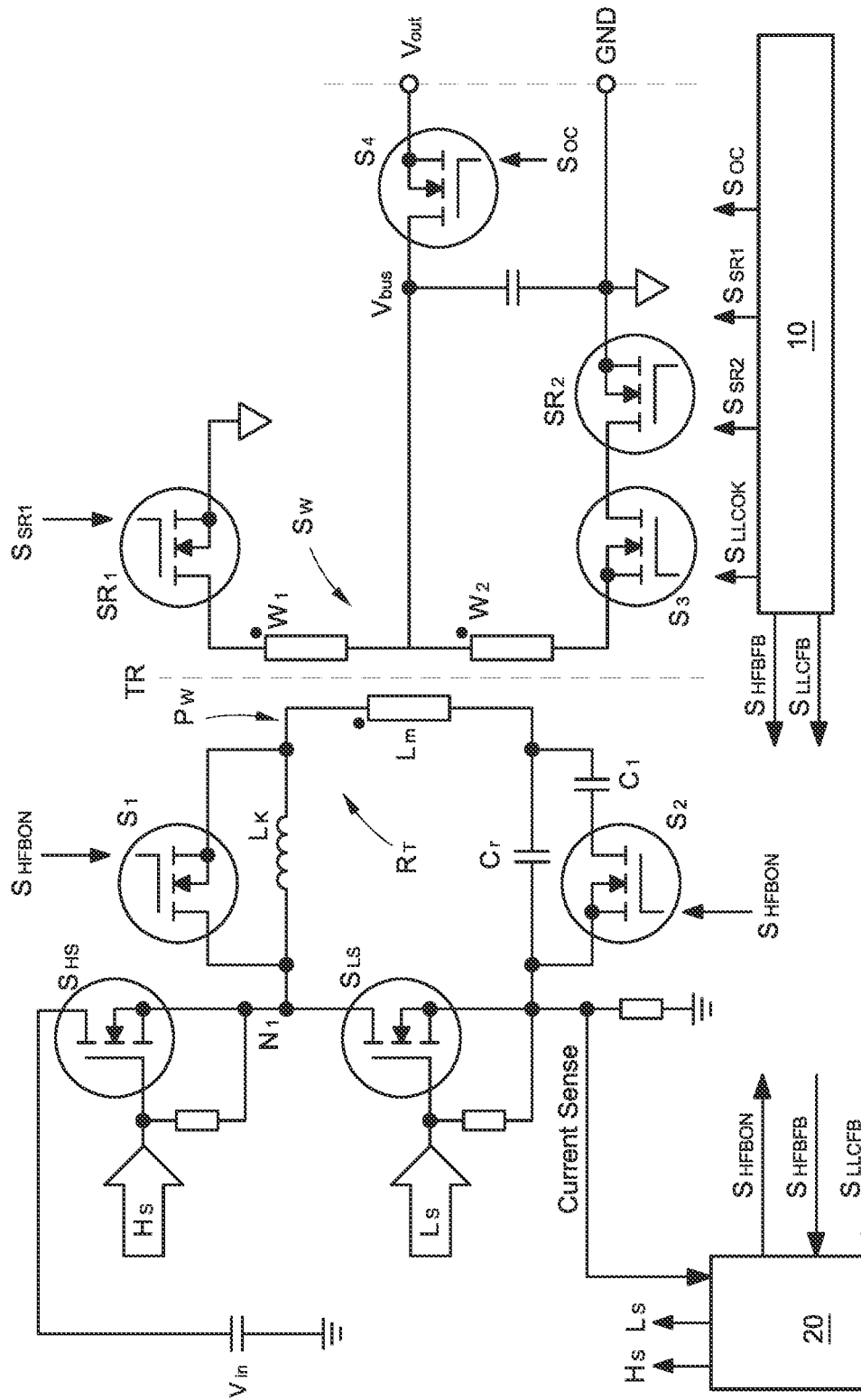
FIG. 3 is a block circuit diagram of a hybrid power conversion circuit according to the present disclosure.

Please refer to FIG. 3, which shows a block circuit diagram of a hybrid power conversion circuit according to the present disclosure. The hybrid power conversion circuit is used to convert an input voltage Vin into an output voltage Vout (or an output bus voltage Vbus). As shown in FIG. 3, the hybrid power conversion circuit includes a high-side switch $S_{HS}$, a low-side switch $S_{LS}$, a transformer TR, a resonance tank $R_T$, a first switch $S_1$, a second switch $S_2$, a first synchronous rectification switch $SR_1$, a second synchronous rectification switch $SR_2$, and a third switch $S_3$. In particular, although there is a fourth switch S4 between the output voltage Vout and the output bus voltage Vbus, the output voltage Vout and the output bus voltage Vbus both refer to the output voltage of the hybrid power conversion circuit, and the details will be explained later.

A first end of the high-side switch $S_{HS}$ and a first end of the low-side switch $S_{LS}$ are coupled to a first node $N_1$. A second end of the high-side switch $S_{HS}$ is coupled to a positive voltage end $V_+$ of the input voltage Vin. A second end of the low-side switch $S_{LS}$ is coupled to a negative voltage end $V_-$ of the input voltage Vin. The transformer TR provides electrical isolation between a primary-side winding Pw and a secondary-side winding Sw.

The resonance tank $R_T$ has an external inductance $L_K$, an external capacitance Cr, and an internal inductance Lm (equivalent inductance) of the primary-side winding Pw. In particular, a first end of the external inductance $L_K$ and a first end of the external capacitance Cr are respectively coupled to the internal inductance Lm. A second end of the external inductance $L_K$ is connected to the first node $N_1$, and a second end of the external capacitance Cr is connected to the negative voltage end $V_-$.

The first switch $S_1$ is connected to the external inductance $L_K$ in parallel, that is, the first switch $S_1$ is connected between the first node $N_1$ and one end of the primary-side winding Pw. The second switch $S_2$ is connected to a first capacitance $C_1$ to form a series-connected path, and the series-connected path is connected to the external capacitance Cr in parallel, that is, the series-connected path is connected between the negative voltage end $V_-$ and the other end of the primary-side winding Pw.

The first synchronous rectification switch $SR_1$ and the second synchronous rectification switch $SR_2$ are respectively coupled to a first winding $W_1$ and a second winding $W_2$ of the secondary-side winding Sw. In this embodiment, the first synchronous rectification switch $SR_1$ is coupled to the first winding $W_1$, and the second synchronous rectification switch $SR_2$ is coupled to the second winding $W_2$. The third switch $S_3$ is connected to the second synchronous rectification switch $SR_2$ in series.

The hybrid power conversion circuit of the present disclosure mainly combines a resonance conversion circuit and a hybrid flyback conversion circuit to achieve high efficiency, high gain, and wide range of variable voltage when the load at a power-receiving end has different power requirements. For example, but not limited to, when the voltage/current power output is 36 to 48V/10 A (such as EPR 36V/48V in the PD specification, but not limited to), it means that the output power is higher (high-wattage output), the hybrid power conversion circuit is controlled to operate in the resonance conversion mode, hereinafter referred to as LLC mode. When the voltage/current power output is 5 to 15V/3 A or 20 to 28V/5 A (such as SPR or EPR 28V in the PD specification, but not limited to), it means that the output power is lower (low-wattage output), the hybrid power conversion circuit is controlled to operate in the flyback conversion mode, hereinafter referred to as HFB mode.

Figure 4:
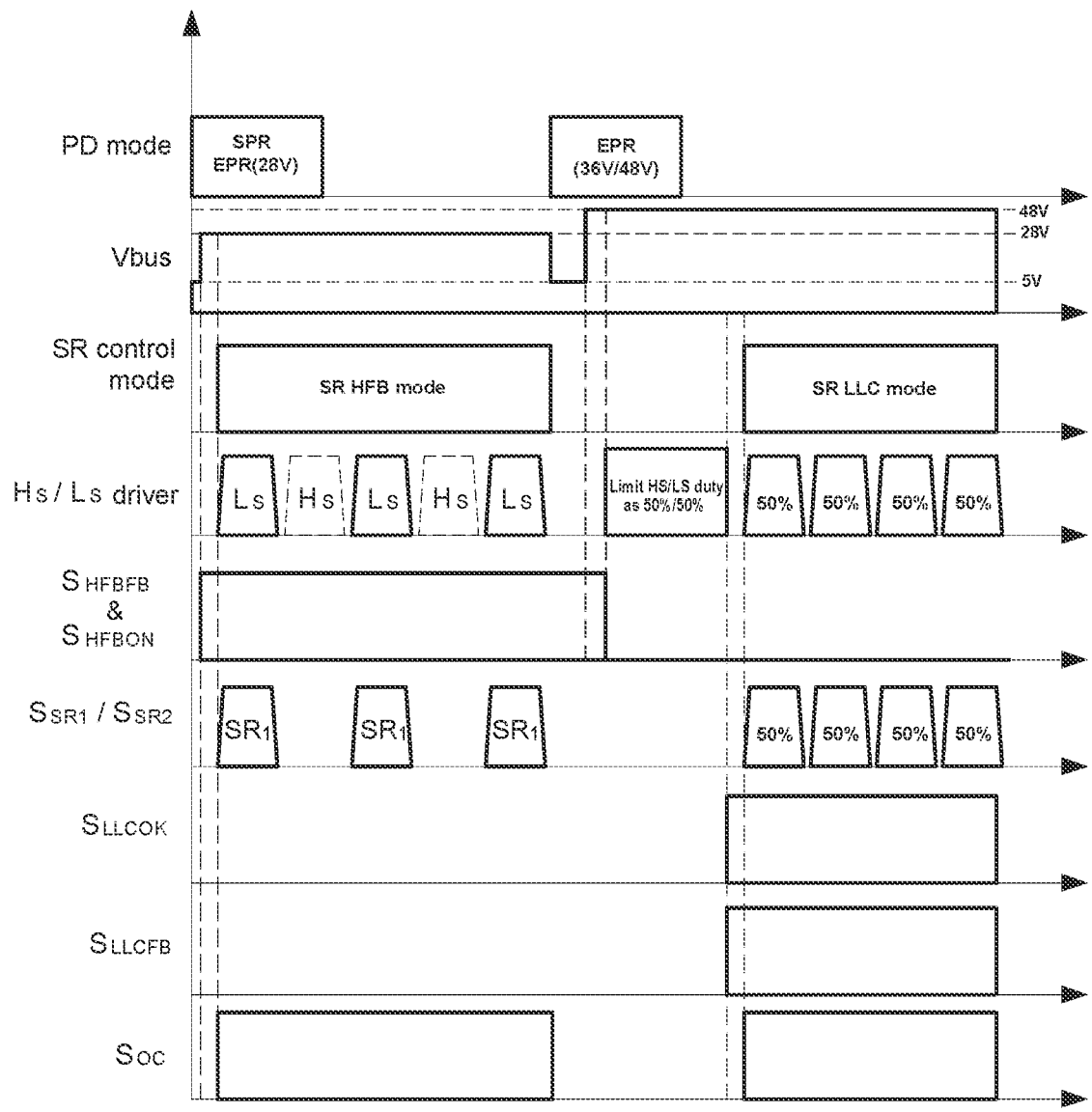
FIG. 4 is a schematic waveform of the discontinuous operation of the hybrid power conversion circuit according to the present disclosure.

Please refer to FIG. 3 and FIG. 4, when a secondary-side control unit 10 determines that the hybrid power conversion circuit has a high-wattage output requirement after the communication with the load (the PD protocol is used as the communication procedure, but the present disclosure is not limited to this), the hybrid power conversion circuit operates in the LLC mode. The secondary-side control unit 10 generates a resonance operation signal $S_{LLCOK}$ to turn on the third switch $S_3$. Simultaneously, the secondary-side control unit 10 generates a resonance feedback signal $S_{LLCFB}$ to notify a primary-side control unit 20. Afterward, the primary-side control unit 20 controls the high-side switch $S_{HS}$ and the low-side switch $S_{LS}$ to make the external inductance $L_K$, the external capacitance Cr, and the internal inductance Lm of the resonance tank $R_T$ perform resonance operation.

Also, the secondary-side control unit 10 generates synchronous rectification signals $S_{SR1}/S_{SR2}$ to respectively control the first synchronous rectification switch $SR_1$ and the second synchronous rectification switch $SR_2$ to perform complementary switching conduction (may be referred to as synchronous rectification control in the LLC mode).

When the secondary-side control unit 10 determines that the hybrid power conversion circuit has a low-wattage output requirement after the communication with the load, the hybrid power conversion circuit operates in the HFB mode. The secondary-side control unit 10 generates a resonance operation signal $S_{LLCOK}$ to turn off the third switch $S_3$. Simultaneously, the secondary-side control unit 10 generates the flyback feedback signal $S_{HFBFB}$ to notify the primary-side control unit 20 so that the primary-side control unit 20 controls the adjustment of parameters of the inductance and capacitance of the resonance tank $R_T$. The secondary-side control unit 10 generates the synchronous rectification signals $S_{SR1}$ to control the first synchronous rectification switch $SR_1$ to perform switching conduction (may be referred to as synchronous rectification control in the HFB mode). As shown in FIG. 1, in this condition, only the first synchronous rectification switch $SR_1$ is switched to provide a conduction (turned-on) path of energy release.

Specifically, the primary-side control unit 20 generates a flyback operation signal $S_{HFBON}$ to turn on the first switch $S_1$ and the second switch $S_2$. Since the first switch $S_1$ is turned on, the external inductance $L_K$ is bypassed, and since the second switch $S_2$ is turned on, the external capacitance Cr and the first capacitance $C_1$ in parallel to provide a new equivalent capacitance value. Therefore, the parameters of the inductance and capacitance of the resonance tank $R_T$ are adjusted. In practical applications, in the HFB mode, since the equivalent capacitance value is changed from the external capacitance Cr to the external capacitance Cr and the first capacitance $C_1$ connected in parallel, and therefore the equivalent capacitance value becomes larger. In particular, in practical applications, the capacitance value of the first capacitor $C_1$ is usually more than twice the capacitance value of the external capacitor Cr. In addition, in the LLC mode, the inductance components (i.e., the external inductance $L_K$ and the internal inductance Lm) are larger and the external capacitance Cr is smaller. On the contrary, in the HFB mode, the inductance component (i.e., only the internal inductance Lm) is relatively small and the equivalent capacitance value of the external capacitance Cr and the first capacitance $C_1$ connected in parallel is relatively large.

Incidentally, in order to operate in the LLC mode or the HFB mode, the hybrid power conversion circuit needs to communicate with the load through, for example, but not limited to, an output bus voltage Vbus of 5 volts. The output bus voltage Vbus is the voltage value between a common-connected point of the first winding $W_1$ and the second winding $W_2$ of the secondary-side winding Sw and a ground point GND. Taking the PD communication protocol as an example, when the secondary-side control unit 10 communicates via the configuration channel pin connected to the load to confirm the operation mode, the output bus voltage Vbus needs to be adjusted back to 5 volts before the communication. That is, the PD protocol is communicated with the load through a no-load 5 volts.

For example, a user A operates a mobile phone with PD function to charge, since its required output power is lower (for example, 12V/3 A output), after the PD communication, the hybrid power conversion circuit operates in the HFB mode to provide a lower output power to charge the mobile phone. Alternatively, a user B operates a bicycle with PD function to charge, since its required output power is higher (for example, 36V/10 A output), after the PD communication, the hybrid power conversion circuit operates in the LLC mode to provide a higher output power to charge the bicycle. In two different operation situations, since the operation behavior between the user A and the user B is in a discontinuous state, that is, after the user A plugs and unplugs the mobile phone to complete the charging, the user B plugs and unplugs the bicycle to complete the charging. Therefore, in the two operation situations, there will be a need for the output bus voltage Vbus to be adjusted back to no-load 5 volts to communicate with the PD.

In addition, as shown in FIG. 4, in the HFB mode, since the duty cycles of the high-side switch $S_{HS}$ and the low-side switch $S_{LS}$ will be adjusted with the load, i.e., $H_S$ and $L_S$ are not fixed as 50% complementary signals (that is, when the high-side switch $S_{HS}$ is turned on, the low-side switch $S_{LS}$ is turned off, and vice versa). During the operation process of switching from the HFB mode to the LLC mode, when the HFB mode still operates, the primary-side control unit 20 will first set the duty cycles of the high-side switch $S_{HS}$ and the low-side switch $S_{LS}$ as complementary signals of 50%. In this condition, the third switch $S_3$ is not turned on yet (i.e., the resonance operation signal $S_{LLCOK}$ remains low), and the current first passes through a body diode of the third switch $S_3$. Once the secondary-side control unit 10 transmits the resonance feedback signal $S_{LLCFB}$ to notify the primary-side control unit 20 to switch to the LLC mode, the third switch $S_3$ is controlled to be turned on.

Figure 5:
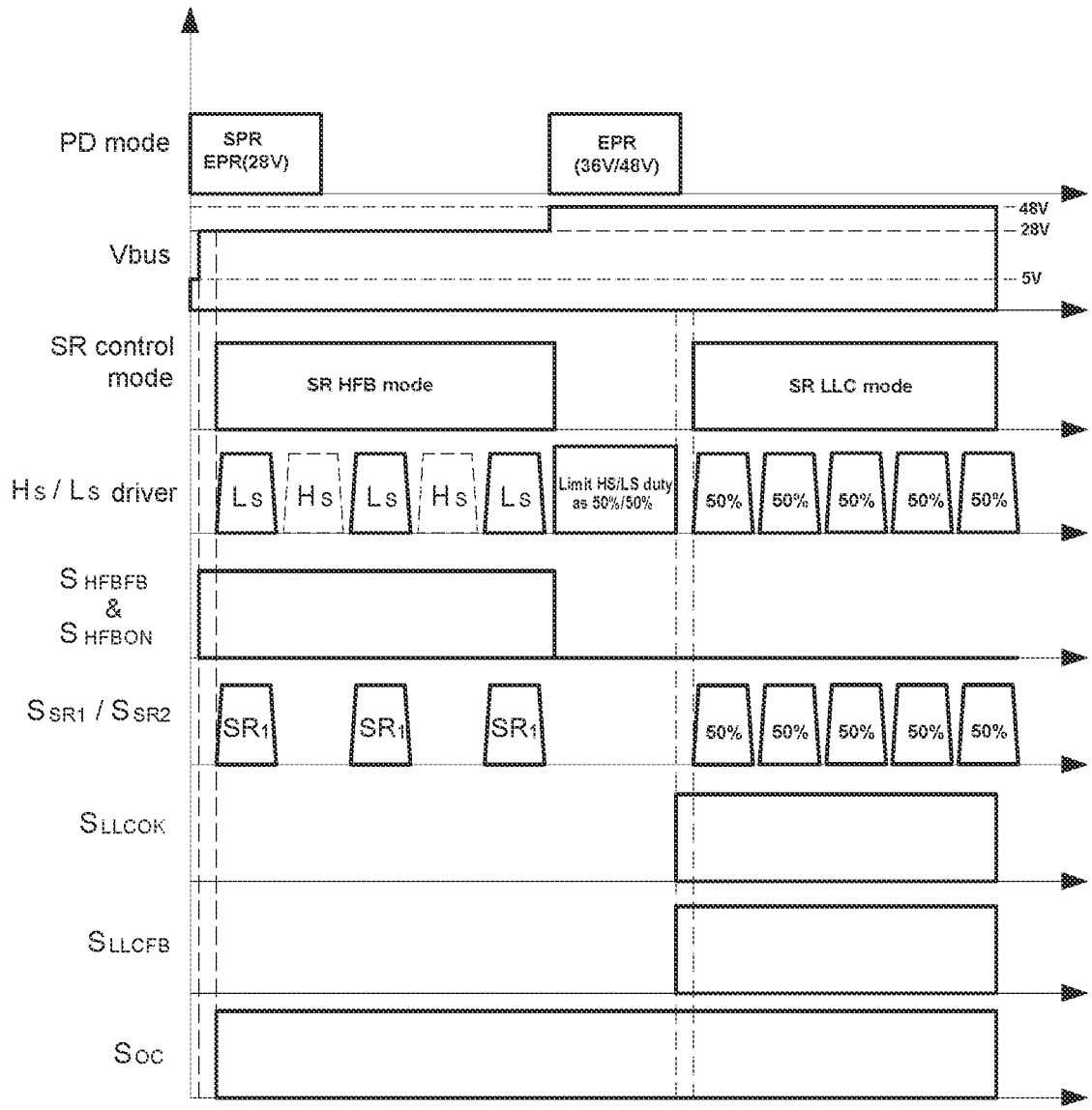
FIG. 5 is a schematic waveform of the continuous operation of the hybrid power conversion circuit according to the present disclosure.

Please refer to FIG. 5, the difference between FIG. 5 and FIG. 4 is that FIG. 5 shows the operation situation of continuous charging. Therefore, there is no need for the output bus voltage Vbus to be adjusted back to the no-load 5 volts to communicate with the load in this operation situation. For example, a user C wants to charge the battery. The charging voltage of the battery is 28 volts in an empty state, and as the battery voltage becomes higher and higher, the required charging voltage also increases. Therefore, for the continuous (unplugged) charging of the battery, the hybrid power conversion circuit operates in the continuous HFB mode and LLC mode to meet the charging requirements of low output power and the high output power. Alternatively, in the application of the motor. With the continuous change of the motor speed, different power supply requirements of low output power and the high output power are required so the hybrid power conversion circuit will operate in continuous HFB mode and LLC mode. Incidentally, FIG. 4 and FIG. 5 both take the HFB mode operation early and the LLC mode operation late as an example. Therefore, if the LLC mode operates early and the HFB mode operates late, the sequence shown in the waveform diagram only needs to be reversed.

In practical applications, in order to avoid the change of the output side voltage (including the output bus voltage Vbus or the output voltage Vout) near the critical voltage value of the switching between the two modes (for example, 28 volts is designed in the present disclosure) to cause frequently switching between the two modes, it is usually determined by the interval voltage or the so-called window voltage. For example, the voltage in this range may be designed to be 27 to 29 volts. When the hybrid power conversion circuit operates in the LLC mode, if the output side voltage is less than 28 volts due to non-ideal changes, but still greater than 27 volts, it still operates in the LLC mode. If the voltage continues to decrease and is less than 27 volts, it is considered that the operation mode needs to be switched, and therefore the LLC mode is switched to the HFB mode. Conversely, when the hybrid power conversion circuit operates in the HFB mode, if the output side voltage is greater than 29 volts due to non-ideal changes, but still less than 29 volts, it still operates in the HFB mode. If the voltage continues to increase and is greater than 29 volts, it is considered that the operation mode needs to be switched, and therefore the HFB mode is switched to the LLC mode.

In addition, based on the requirements of the PD specification, the hybrid power conversion circuit of the present disclosure further includes a fourth switch $S_4$. The fourth switch $S_4$ is connected to the output side of the hybrid power conversion circuit. The fourth switch $S_4$ is turned on or turned off to control whether to output power to the connected load, for example, but not limited to, a mobile phone, a notebook computer, a tablet computer, a bicycle, etc. Therefore, when an output control signal $S_{OC}$ generated by the secondary-side control unit 10 turns on the fourth switch $S_4$, the power can be outputted to the load for power supply or charging, otherwise, the power cannot be outputted to the load.

Figure 7:
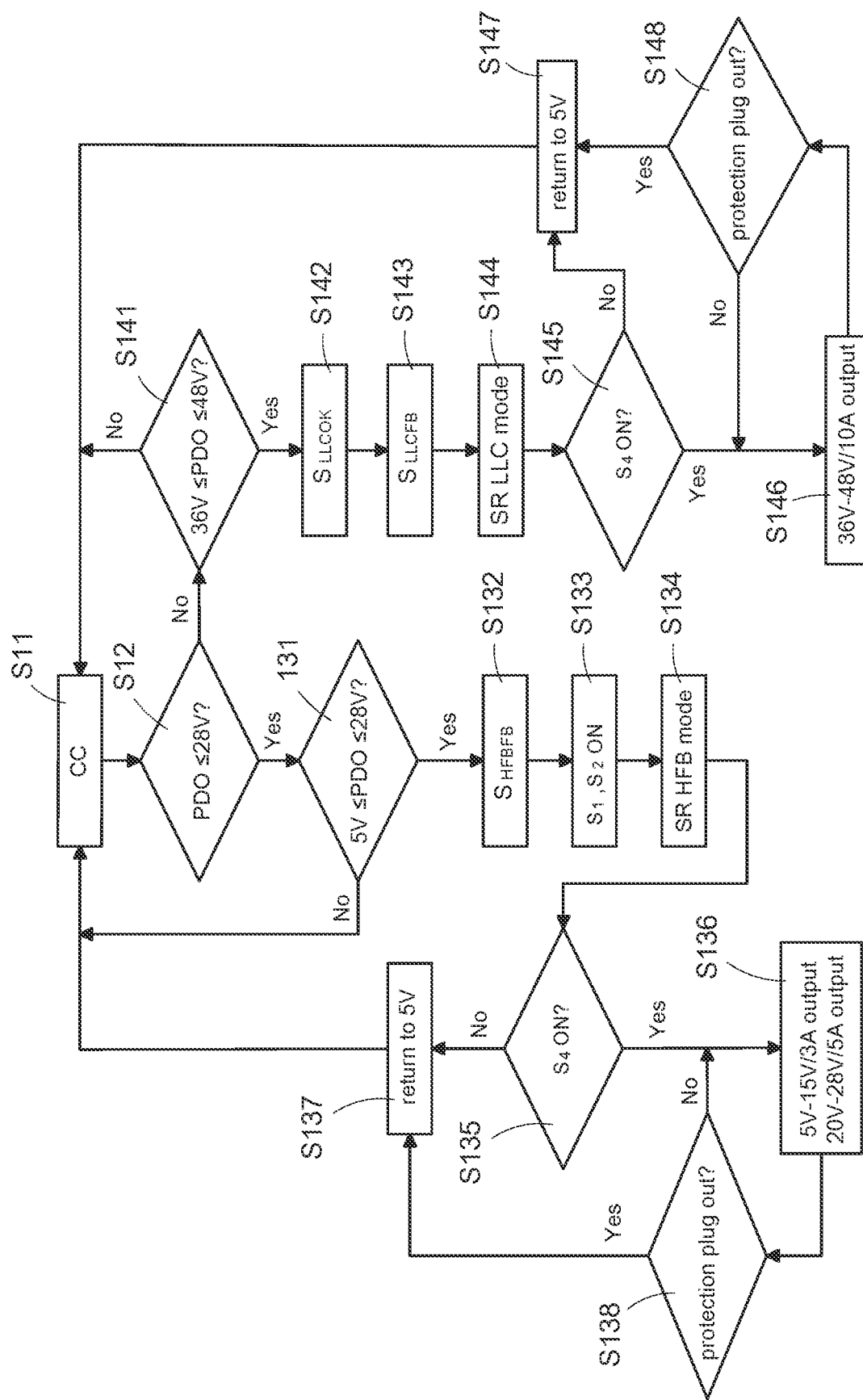
FIG. 7 is a flowchart of operating the hybrid power conversion circuit in different modes according to the present disclosure.

Please refer to FIG. 7, which shows a flowchart of operating the hybrid power conversion circuit in different modes according to the present disclosure, and also refer to FIG. 3, FIG. 4, and FIG. 5. Incidentally, the electrical numerical values listed in the flowchart are only for the purpose of convenience of description, and are not intended to limit the present disclosure.

First, the secondary-side control unit 10 of the hybrid power conversion circuit communicates with the load (S11). In the communication step (S11), a repeat update function is provided, that is, it can continuously communicate with the load to update the load demand. Afterward, it is determined whether the voltage required by the load (hereinafter referred to as PDO) is less than 28 volts (S12). If the determination of step (S12) is "YES", then is further determined whether the PDO is between 5 volts and 28 volts (S131). If the determination of step (S131) is "NO", returns to step (S11) to continuously communicate. If the determination of step (S131) is "YES" (i.e., the PDO is between 5 volts and 28 volts), it means that the hybrid power conversion circuit operates in the HFB mode. Therefore, the secondary-side control unit 10 generates the resonance operation signal $S_{LLCOK}$ to turn off the third switch $S_3$. Simultaneously, the secondary-side control unit 10 generates the flyback feedback signal $S_{HFBFB}$ to notify the primary-side control unit 20 (S132) so that the primary-side control unit 20 generates the flyback operation signal $S_{HFBON}$ to turn on the first switch $S_1$ and the second switch $S_2$ (S133). Simultaneously, the primary-side control unit 20 controls the high-side switch $S_{HS}$ and the low-side switch $S_{LS}$ to perform non-forced symmetrical complementary conduction switching.

Afterward, the synchronous rectification control in the HFB mode is performed (S134). The secondary-side control unit 10 generates the synchronous rectification signals $S_{SR1}$ to control the first synchronous rectification switch $SR_1$ to perform switching conduction (switched on). In this condition, only the first synchronous rectification switch $SR_1$ is switched to provide a conduction (turned-on) path of energy release.

Afterward, it is determined whether the fourth switch $S_4$ is turned on (S135). If the fourth switch $S_4$ is turned on, according to the power supply demand of the load, the output power of 5-15V/3 A or the output power of 20-28V/5 A is provided (S136). If the fourth switch $S_4$ is turned off (for example, the switch is abnormal or the power output is not allowed), the output side voltage is adjusted back to 5 volts (S137), and then the no-load 5 volts is provided to communicate with the load (S11). In addition, in the process of outputting power in step (S136), it is determined whether the load is removed (S138). If the determination of step (S138) is "YES", adjusts the output side voltage back to 5 volts (S137), and then communicates with the load through the no-load 5 volts (S11). If the determination of step (S138) is "NO", the output power is continued (S136).

If the determination of step (S12) is "NO", determines whether the PDO is between 36 volts and 48 volts (S141). If the determination of step (S141) is "NO", returns to step (S11) to continuously communicate. If the determination of step (S141) is "YES" (i.e., the PDO is between 36 volts and 48 volts), it means that the hybrid power conversion circuit operates in the LLC mode. Therefore, the secondary-side control unit 10 generates the resonance operation signal $S_{LLCOK}$ to turn on the third switch $S_3$. Simultaneously, the secondary-side control unit 10 generates the resonance feedback signal $S_{LLCFB}$ to notify the primary-side control unit 20 (S143) so that the primary-side control unit 20 controls the high-side switch $S_{HS}$ and the low-side switch $S_{LS}$ to perform complementary switching at a duty cycle of 50%, thereby making the external inductance $L_K$, external capacitance Cr, and internal inductance Lm of the resonance tank $R_T$ (that is, the equivalent inductance of the primary-side winding Pw) perform resonance operation.

Afterward, the synchronous rectification control in the LLC mode is performed (S144). The secondary-side control unit 10 generates synchronous rectification signals $S_{SR1}$/$S_{SR2}$ to respectively control the first synchronous rectification switch $SR_1$ and the second synchronous rectification switch $SR_2$ to perform switching conduction (switched on). In this condition, the first synchronous rectification switch $SR_1$ and the second synchronous rectification switch $SR_2$ perform complementary switching conduction (switched on) at a duty cycle of 50%.

Afterward, it is determined whether the fourth switch $S_4$ is turned on (S145). If the fourth switch $S_4$ is turned on, according to the power supply demand of the load, the output power of 36-48V/10 A is provided (S146). If the fourth switch $S_4$ is turned off (for example, the switch is abnormal or the power output is not allowed), the output side voltage is adjusted back to 5 volts (S147), and then the no-load 5 volts is provided to communicate with the load (S11). In addition, in the process of outputting power in step (S146), it is determined whether the load is removed (S148). If the determination of step (S148) is "YES", adjusts the output side voltage back to 5 volts (S147), and then communicates with the load through the no-load 5 volts (S11). If the determination of step (S148) is "NO", the output power is continued (S146). Accordingly, through the communication with the load, with the detection of the output side voltage (including the output bus voltage Vbus or the output voltage Vout), to determine whether the hybrid power conversion circuit operates in the HFB mode or the LLC mode, thus achieving high efficiency, high gain, and the effect of a wide range of variable voltage under different output power requirements.

Figure 6:
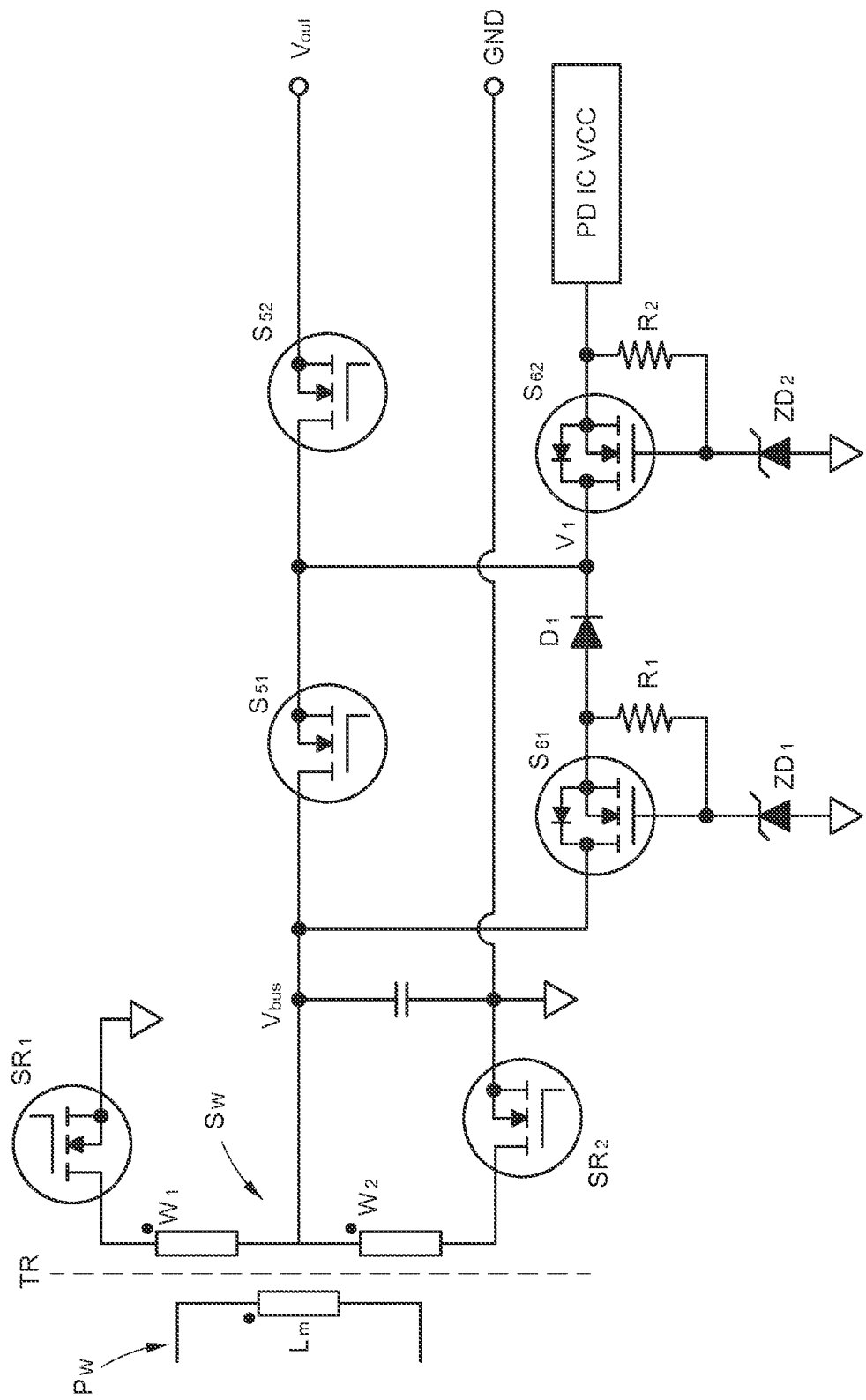
FIG. 6 is a circuit diagram of the hybrid power conversion circuit operating in an LLC mode to generate a communication voltage according to the present disclosure.

Please refer to FIG. 6, which shows a circuit diagram of the hybrid power conversion circuit operating in an LLC mode to generate a communication voltage according to the present disclosure. The communication voltage generation circuit is used for generating the communication voltage required for determining that the hybrid power conversion circuit operates in the HFB mode and the LLC mode. The communication voltage generation circuit mainly includes switches $S_{51}$, $S_{52}$, switches $S_{61}$, $S_{62}$, Zener diodes $ZD_1$, $ZD_2$, resistors $R_1$, $R_2$, and a diode $D_1$. A first end of the switch $S_{51}$ is connected to a first end of the switch $S_{61}$, and is coupled to the first winding $W_1$ and the second winding $W_2$ to receive the output bus voltage Vbus.

The Zener diode $ZD_1$ is coupled between a control end of the switch $S_{61}$ and a ground end. The resistor $R_1$ is coupled between a second end of the switch $S_{61}$ and the Zener diode $ZD_1$. An anode of the diode $D_1$ is coupled to the second end of the switch $S_{61}$ and the resistor $R_1$, and a cathode of the diode $D_1$ is coupled to a second end of the switch $S_{51}$, a first end of the switch $S_{52}$, and a first end of the switch $S_{62}$ at a node $V_1$. The Zener diode $ZD_2$ is coupled between a control end of the switch $S_{62}$ and the ground end. The resistor $R_2$ is coupled between a second end of the switch $S_{62}$ and the Zener diode $ZD_2$. A second end of the switch $S_{52}$ provides the output voltage Vout, and a second end of the switch $S_{62}$ provides a power source (PD IC VCC) for a PD IC.

Due to the requirements of the PD specification, the power conversion circuit needs to communicate with the load in the PD protocol with a no-load 5 volts. However, since the LLC circuit cannot meet a wide range of variable voltage requirement, that is, when only using the LLC circuit (or operating in LLC mode), due to the limitation of the gain value, it is not suitable to generate a voltage of 5 volts to meet the PD specification. Therefore, the circuit shown in FIG. 6, i.e., the circuit on the secondary side, is designed to generate a voltage of 5 volts.

Specifically, before the load (i.e., the load with PD protocol) is plugged in for use, the output bus voltage Vbus between the first winding $W_1$ and the second winding $W_2$ after being converted by the transformer TR is 28 volts. The generated output bus voltage Vbus turns on the switch $S_{61}$, and the output bus voltage Vbus passes through the Zener diode $ZD_1$, the resistor $R_1$, and the diode $D_1$ to establish a voltage of 5 volts is built at the node $V_1$. Afterward, when the load is connected, the established voltage of 5 volts is used as the no-load communication with the load by turning on the switch $S_{52}$. In addition, the voltage of 5 volts also provides the power required for the normal operation of the PD IC through the second end of the switch $S_{62}$.

After determining that the load has the PD protocol (function) and that the load requests a supply voltage of 48 volts, the control switch $S_{51}$ is turned on so that the 48-volt output bus voltage Vbus converted by the transformer TR provides the power required by the load. Furthermore, the 48-volt voltage establishes a 15-volt voltage on the second end of the switch $S_{62}$ through the switch $S_{62}$, the Zener diode $ZD_2$, and the resistor $R_2$ so as to provide the power required for the normal operation of the PD IC. In one embodiment, since the acceptable power supply voltage of the PD IC is a wide voltage range, the above-mentioned 5-volt voltage and 15-volt voltage can both be used to provide the power required for the normal operation of the PD IC.

In addition, if the PD IC cannot be powered by the above-mentioned 5-volt voltage and 15-volt voltage, the required power can be externally provided, that is, a voltage of 5 volts is provided by the programmer for the programming (burning) process of the PD IC, and the voltage of 5 volts is provided to the PD IC through a body diode (not shown) of the switch $S_{52}$ and the switch $S_{62}$.

In summary, the advantages and features of the present disclosure are:

1. The hybrid power conversion circuit of the present disclosure combines the advantages of HFB and LLC to form a circuit structure that can not only achieve the wide-range variable voltage of 5 to 48 volts but also utilizes the ZVS characteristic and high magnetic flux utilization of LLC, and therefore the optimization of efficiency can be significantly increased compared with pure flyback.

2. When the power exceeds 240 watts, the hybrid circuit structure has reached its limit, and the LLC structure must be used to support the power range of more than 240 watts. Therefore, the topology conversion between the HFB and LLC is achieved through the same circuit, and the output side voltage is detected through the communication with the load to determine whether the hybrid power conversion circuit should operate in the HFB mode or the LLC mode. Accordingly, high efficiency, high gain, and the effect of a wide range of variable voltage can be achieved under different output power requirements.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion circuit, configured to convert an input voltage into an output voltage, the power conversion circuit comprising:
    a high-side switch and a low-side switch connected to the high-side switch,
    a transformer, comprising a primary-side winding and a secondary-side winding,
    a resonance tank, comprising an external inductance, an external capacitance, and the primary-side winding coupled in series, wherein the resonance tank is connected to the low-side switch in parallel,
    a first switch, connected to the external inductance in parallel,
    a second switch and a first capacitance forming a series-connected path, wherein the series-connected path is connected to the external capacitance in parallel, and
    a third switch, connected to the secondary-side winding in series,
    wherein when the power conversion circuit operates under a low-wattage output, the third switch is turned off, and the first switch and the second switch are turned on; when the power conversion circuit operates under a high-wattage output, the third switch is turned on, and the first switch and the second switch are turned off.

2. The power conversion circuit as claimed in claim 1, further comprising:
    a first synchronous rectification switch and a second synchronous rectification switch, respectively coupled to a first winding and a second winding of the secondary-side winding.

3. The power conversion circuit as claimed in claim 2, wherein the third switch is connected to the second synchronous rectification switch.

4. The power conversion circuit as claimed in claim 2, wherein under the low-wattage output, the first synchronous rectification switch is switched on, and the high-side switch and the low-side switch are switched on.

5. The power conversion circuit as claimed in claim 4, further comprising a secondary-side control unit and a primary-side control unit,
    the secondary-side control unit provides a first operation signal to turn off the third switch, the primary-side control unit controls the high-side switch and the low-side switch switched on, the primary-side control unit provides a second operation signal to turn on the first switch and the second switch, and the secondary-side control unit provides a synchronous rectification signal to control the first synchronous rectification switch switched on.

6. The power conversion circuit as claimed in claim 2, wherein under the high-wattage output, the first synchronous rectification switch and the second synchronous rectification switch are switched on, and the high-side switch and the low-side switch are switched on.

7. The power conversion circuit as claimed in claim 6, further comprising a secondary-side control unit and a primary-side control unit, the secondary-side control unit provides a first operation signal to turn on the third switch, the primary-side control unit controls the high-side switch and the low-side switch switched on, the primary-side control unit provides a second operation signal to turn off the first switch and the second switch, and the secondary-side control unit provides a synchronous rectification signal to control the first synchronous rectification switch and the second synchronous rectification switch switched on.

8. The power conversion circuit as claimed in claim 1, wherein the high-side switch is connected to a positive voltage end of the input voltage, and the low-side switch is connected to a negative voltage end of the input voltage.

9. The power conversion circuit as claimed in claim 1, wherein under the low-wattage output, a voltage/current power output of the power conversion circuit is 5 to 15V/3 A or 20 to 28V/5 A; under the high-wattage output, the voltage/current power output of the power conversion circuit is 36 to 48V/10 A.

10. The power conversion circuit as claimed in claim 1, wherein the capacitance value of the first capacitance and the capacitance value of the external capacitance have a proportional relationship of more than two times.

11. The power conversion circuit as claimed in claim 1, further comprising:

a fourth switch, coupled to the secondary-side winding, and configured to control output of the output voltage.

12. The power conversion circuit as claimed in claim 1, wherein from the operation under the low-wattage output to the operation under the high-wattage output, the duty cycles of the high-side switch and the low-side switch are preset to be 50%.

13. The power conversion circuit as claimed in claim 1, further comprising:

a communication voltage generation circuit, configured to generate a communication voltage required for determining that the power conversion circuit operates under the low-wattage output and the high-wattage output.

14. The power conversion circuit as claimed in claim 13, wherein the communication voltage generation circuit comprising:

a sixth switch, a first end of the sixth switch coupled to the first winding and the second winding, a Zener diode, coupled to a control end of the sixth switch, a resistor, coupled to a second end of the sixth switch and the Zener diode, a diode, an anode of the diode coupled to the second end of the sixth switch and the resistor, and a fifth switch, a first end of the fifth switch coupled to a cathode of the diode, and a second end of the fifth switch configured to provide the output voltage.

15. The power conversion circuit as claimed in claim 13, wherein the communication voltage is 5-volt DC voltage.

* * * * *